US009472178B2

(12) United States Patent
Kruge

(10) Patent No.: US 9,472,178 B2
(45) Date of Patent: Oct. 18, 2016

(54) SCORE-DIRECTED STRING RETUNING AND GESTURE CUEING IN SYNTHETIC MULTI-STRING MUSICAL INSTRUMENT

(71) Applicant: Smule, Inc., San Francisco, CA (US)

(72) Inventor: Nick Kruge, San Francisco, CA (US)

(73) Assignee: Smule, Inc., San Francisco, CA (US)

( * ) Notice: Subject to any disclaimer, the term of this patent is extended or adjusted under 35 U.S.C. 154(b) by 225 days.

(21) Appl. No.: 14/285,391

(22) Filed: May 22, 2014

(65) Prior Publication Data

US 2014/0349761 A1 Nov. 27, 2014

Related U.S. Application Data

(60) Provisional application No. 61/826,400, filed on May 22, 2013.

(51) Int. Cl.

| | | |
|---|---|---|
| G10H 1/36 | (2006.01) | |
| A63F 13/814 | (2014.01) | |
| A63F 13/426 | (2014.01) | |
| A63F 13/2145 | (2014.01) | |
| A63F 13/5375 | (2014.01) | |
| A63F 13/54 | (2014.01) | |
| A63F 13/31 | (2014.01) | |
| A63F 13/44 | (2014.01) | |
| G10H 1/38 | (2006.01) | |
| A63F 13/92 | (2014.01) | |
| A63F 13/792 | (2014.01) | |

(52) U.S. Cl.
CPC .......... *G10H 1/368* (2013.01); *A63F 13/2145* (2014.09); *A63F 13/31* (2014.09); *A63F 13/426* (2014.09); *A63F 13/44* (2014.09); *A63F 13/5375* (2014.09); *A63F 13/54* (2014.09); *A63F 13/814* (2014.09); *G10H 1/386* (2013.01); *A63F 13/792* (2014.09); *A63F 13/92* (2014.09); *A63F 2300/6081* (2013.01); *G10H 2220/096* (2013.01); *G10H 2220/126* (2013.01); *G10H 2220/135* (2013.01); *G10H 2240/325* (2013.01)

(58) Field of Classification Search
CPC ..................... G10H 2220/096; G10H 1/0016; G10H 2220/241; G10H 2230/015; G10H 2210/091; G10H 1/368; G10H 2220/126; G10H 2220/135; A63F 13/814; A63F 13/426; A63F 13/2145; A63F 13/54; A63F 13/31; A63F 13/44; A63F 2300/6081; A63F 13/92; A63F 13/792
See application file for complete search history.

(56) References Cited

U.S. PATENT DOCUMENTS

| | | | |
|---|---|---|---|
| 8,983,829 B2 | 3/2015 | Cook et al. | |
| 9,035,162 B2 | 5/2015 | Hamilton et al. | |
| 9,082,380 B1* | 7/2015 | Hamilton | G10H 1/368 |
| 2011/0146477 A1* | 6/2011 | Tsukamoto | G09B 15/003 84/485 R |
| 2012/0160079 A1* | 6/2012 | Little | G10H 1/38 84/613 |
| 2012/0174735 A1* | 7/2012 | Little | G10H 1/0008 84/613 |
| 2012/0174736 A1* | 7/2012 | Wang | G10H 1/0008 84/622 |

(Continued)

*Primary Examiner* — Jeffrey Donels
(74) *Attorney, Agent, or Firm* — Haynes and Boone, LLP

(57) ABSTRACT

Despite practical limitations imposed by mobile device platforms and applications, truly captivating musical instruments may be synthesized in ways that allow musically expressive performances to be captured and rendered in real-time. Visual cues presented on a multi-touch sensitive display provide the user with temporally sequenced string excitation cues. Note or chord soundings are indicated by user gestures (e.g., pluck-type gestures, strum-type gestures, chord selections, etc.) captured at the multi-touch sensitive display. Those captured gestures, rather than simply the score itself, are used as inputs to a digital synthesis of the musical instrument.

42 Claims, 6 Drawing Sheets

(56) References Cited

U.S. PATENT DOCUMENTS

| | | | |
|---|---|---|---|
| 2013/0180385 A1* | 7/2013 | Hamilton | G10H 1/0016 84/603 |
| 2014/0083279 A1* | 3/2014 | Little | G10H 1/0008 84/609 |
| 2014/0349761 A1* | 11/2014 | Kruge | A63F 13/814 463/35 |

* cited by examiner

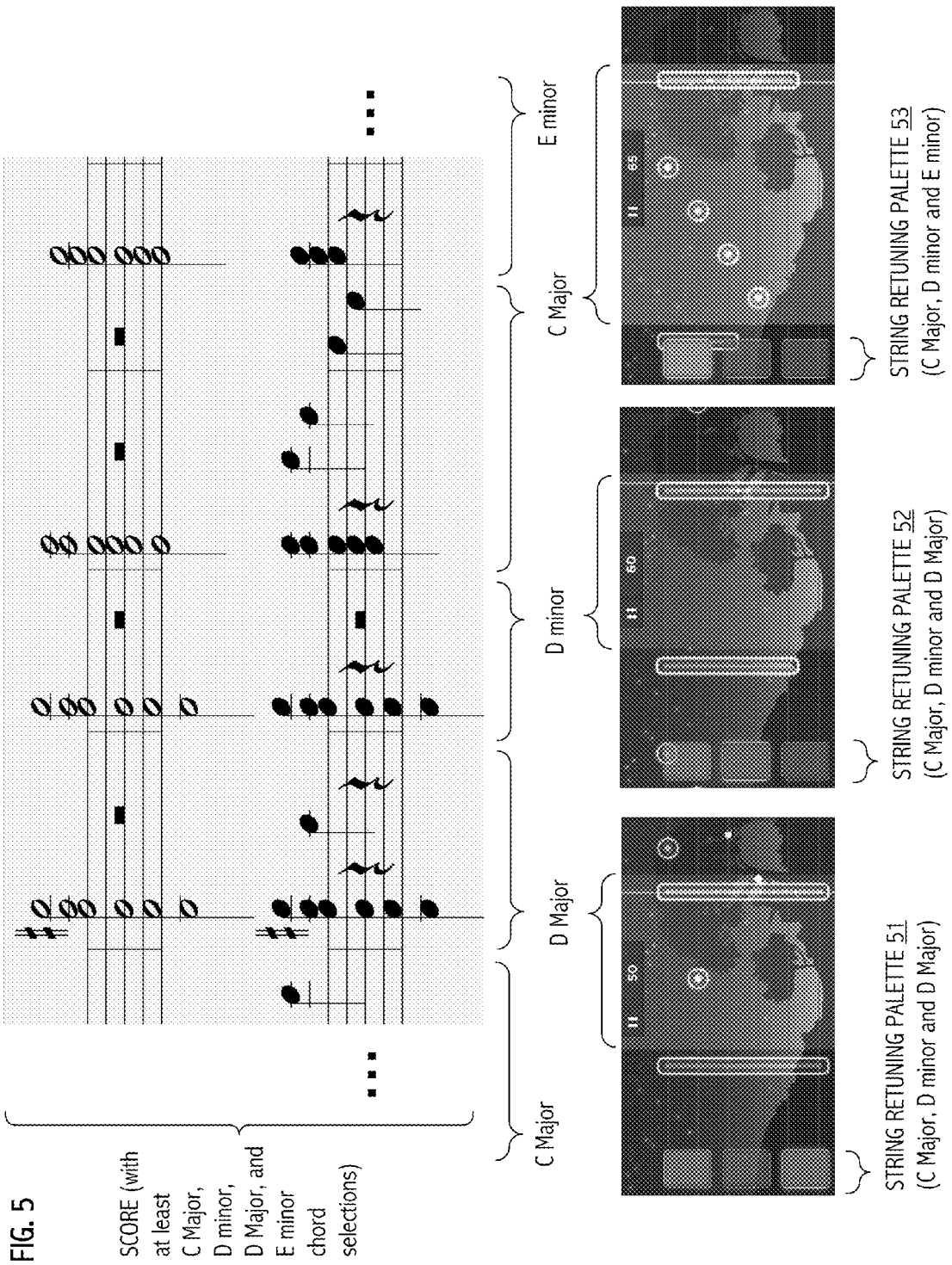

SCORE-DIRECTED STRING RETUNING AND GESTURE CUEING IN SYNTHETIC MULTI-STRING MUSICAL INSTRUMENT

CROSS-REFERENCE TO RELATED APPLICATIONS

The present application claims priority of U.S. Provisional Application No. 61/826,400, filed May 22, 2013. The foregoing application is incorporated herein by reference.

BACKGROUND

1. Field of the Invention

The invention relates generally to musical instruments and, in particular, to techniques suitable for use in portable device hosted implementations of musical instruments for capture and rendering of musical performances with game-play features.

2. Related Art

The installed base of mobile phones and other handheld compute devices grows in sheer number and computational power each day. Hyper-ubiquitous and deeply entrenched in the lifestyles of people around the world, they transcend nearly every cultural and economic barrier. Computationally, the mobile phones of today offer speed and storage capabilities comparable to desktop computers from less than ten years ago, rendering them surprisingly suitable for real-time sound synthesis and other digital signal processing. Indeed, modern mobile phones and handheld compute devices, including iOS™ devices such as the iPhone™, iPod Touch™ and iPad™ digital devices available from Apple Inc. as well as competitive devices that run the Android operating system, tend to support audio (and indeed video) playback and processing quite capably. In addition, multi-touch user interface frameworks provided in such devices create new opportunities for human machine interactions.

These capabilities (including processor, memory and I/O facilities suitable for real-time digital signal processing, hardware and software CODECs, audiovisual and touch screen APIs, etc.) have contributed to vibrant application and developer ecosystems. Examples from the synthetic musical instrument application space include the popular Ocarina, Magic Piano™ and Magic Guitar social music apps, the innovative Magic Fiddle app, pitch-correcting vocal capture apps such Sing!, Glee Karaoke, and I Am™ T-Pain, all from Smule, Inc. As synthetic musical instruments designs develop and mature, innovative techniques are needed to simulate, extend and, indeed, improve upon musician-instrument interactions that, while familiar from the physical world, present challenges for implementations of synthetic instruments on general purpose hardware such as the ubiquitous mobile phones and handheld compute devices discussed above. Likewise, innovative digital synthetic instrument designs are needed to tap the potential of engaging social, interactive, and even game-play experiences.

SUMMARY

Despite practical limitations imposed by mobile device platforms and applications, truly captivating musical instruments may be synthesized in ways that allow musically expressive performances to be captured and rendered in real-time. Visual cues presented on a multi-touch sensitive display provide the user with temporally sequenced string excitation cues. Note or chord soundings are indicated by user gestures (e.g., pluck-type gestures, strum-type gestures, chord selections, etc.) captured at the multi-touch sensitive display. Those captured gestures, rather than simply the score itself, are used as inputs to a digital synthesis of the musical instrument.

It has been discovered that, notwithstanding the multi-string nature of certain instruments that may be synthesized (e.g., guitars) and relative complex human finger articulations necessary to the physical instrument analogs, alternative visual cuing and gesture expression models may be more suitable for the limited touch-screen real-estate provided by mobile handheld devices such as phones, media players, gaming controllers, etc. Accordingly, a "travelling score" style set of timed visual cues has been adopted to provide a song-mode user of a synthetic guitar-type (multi-string) musical instrument with note and/or chord selection cues (in accordance with a musical score). Thus, in a virtual "playhead" presentation, the visual cuing and note expression gesture model for a multi-string fretted instrument can rationalized and simplified to a laterally extended note sounding zone, without regard to fretted quantization of pitches or precise fingerings of respective strings.

In some cases, modes or embodiments described herein, the synthetic multi-string musical instrument is of a type that persons of ordinary skill in the art will recognize as synthetic analogue of a classic, and physical, six-string acoustic guitar. Terminology and use scenarios characteristic of the physical analogue are for purposes of illustration and shall not be taken as limiting; however, the classic six-string acoustic guitar does provide a useful illustration of techniques to provide a captivating synthetic musical instrument on intimate, indeed handheld, mobile device platforms.

In some embodiments, a synthetic guitar-type (multi-string) musical instrument captures a stream of expressive gestures indicated on a multi-touch sensitive display for string excitations and, in some cases, modes or embodiments, chord selections and associated performance effects and embellishments. While the visual cues are driven by a musical score and revealed/advanced at a current performance tempo, it is the user's gestures that actually drive the audible performance rendering. Opportunities for user expression (or variance from score) can include onset and duration of note soundings, tempo changes, as well as uncued string bend effects, vibrato, etc.

Strings of the synthetic guitar-type musical instrument are dynamically retunable. In some cases, modes or embodiments, the dynamic retuning is automatic and driven by a musical score that includes, or is augmented to include, a chord track. The chord track, together with string excitation gestures expressed by a user-musician at a multi-touch display, drives the digital synthesis and thereby allows real-time audible rendering of a user-musician's performance expressed in response to the visual cueing.

In some cases, modes or embodiments, the dynamic retuning is under control of the user-musician, e.g., based on chord selection gestures expressed at the multi-touch display. To facilitate this more advanced level of expression, while still recognizing practical limitations on display image footprint allocable to chord selection, some modes or embodiments provide a dynamic palette of currently-available string retunings. Contents of the dynamic palette are varied throughout the course of a visually-cued, score-driven performance capture in correspondence with a current window of applicable chords contextually selected from the full set of chord selections that may be scored for an entire performance. In this way, a small number, perhaps three (3), of contextually relevant chord selection options may be offered to the user musician at any given point in performance capture, notwithstanding a larger number, perhaps six to eight (6-8) or more that may be scored for the full performance. The user-musician may, in turn, gesture chord selections from this dynamic palette.

In some cases, embodiments or modes, the synthetic multi-string musical instruments described herein can provide a game, grading or instructional mode in which one or more qualities of a user's performance are assessed relative to a musical score. In some cases, embodiments or modes, note/chord soundings may be coordinated but gestured (and indeed graded) separately from note/chord selections. By constantly adapting to actual performance characteristics and, in some cases, to the level of a given user-musician's skill, user interactions with the synthetic musical instrument can be made more engaging and may capture user interest over generally longer periods of time.

Indeed, as economics of application software markets (at least those for portable handheld device type software popularized by Apple's iTunes Store for Apps and the Google Play! Android marketplace) transition from initial purchase price revenue models to longer term and recurring monetization strategies, such as through in-app purchases, user and group affinity characterization and social networking ties, importance of long term user engagement with an application or suite is of increasing importance. In some cases, embodiments or modes, the synthetic multi-string musical instruments described herein, provide a user interaction platform for purchase or license transactions involving premium content such as additional musical scores, backing track content, artist-specific content or performance effects, advanced modes of play or collaboration, etc. In some cases, embodiments or modes, gradings or assessments of captured user performances may be used as a virtual currency in such purchase or license transactions.

In some embodiments in accordance with the present invention, a method includes using a portable computing device as a synthetic multi-string musical instrument; retrieving a musical score from storage accessible to the portable computing device, presenting string excitation visual cues on a multi-touch sensitive display of the portable computing device in temporal correspondence with the retrieved musical score, and capturing a stream of user performance gestures on the multi-touch sensitive display, wherein at least some of the captured gestures are indicative of string excitations. The method includes audibly rendering the user performance on the portable computing device using the captured gesture stream as an input to a digital synthesis of the synthetic multi-string musical instrument executing on the portable computing device with dynamic string retuning in correspondence with chord selections, wherein the captured string excitation indicative gestures, and not the musical score itself, drives the digital synthesis.

In some cases or embodiments, the dynamic retuning is automatic and in correspondence with the chord track. In some cases or embodiments, the method further includes visually presenting on the multi-touch sensitive display (based on the chord track) both a dynamic palette of user selectable chords and chord selection visual cues. At least some of the captured gestures are indicative of actual chord selections gestured by the user using the dynamic palette, and the dynamic string retuning is in correspondence with the captured chord selection indicative gestures.

In some cases or embodiments, the captured string excitation indicative gestures include both pluck-type and strum-type gestures. In some cases or embodiments, the method further includes normalizing a velocity attribute of a pluck-type string excitation indicative gesture to speeds of strum-type string excitation indicative gestures within a current temporal window of the user's performance.

In some cases or embodiments, the digital synthesis includes a sample-based synthesis of constituent notes of the chord selections in correspondence with individually captured string excitations. In some cases or embodiments, the digital synthesis includes a sample-based synthesis of the chord selections in correspondence with a captured strum-type excitation gesture. In some cases or embodiments, the synthetic multi-string musical instrument is a guitar.

In some cases or embodiments, the method further includes determining correspondence of captured gestures with the visual cuings and grading the user's performance at least in part based on the determined correspondences, wherein the determined correspondences include a measure of temporal correspondence of a particular gesture with arrival of a corresponding visual cue in a sounding zone. In some cases or embodiments, the method further includes presenting on the multi-touch sensitive display a lesson plan of exercises, wherein the captured gestures correspond to performance by the user of a particular one of the exercises and advancing the user to a next exercise of the lesson plan based on a grading of the user's performance of the particular exercise.

In some cases or embodiments, the portable computing device includes a communications interface and the method further includes transmitting an encoded stream of the captured gestures via the communications interface for rendering of the performance on a remote device. In some cases or embodiments, the method further includes geocoding the transmitted gesture stream and displaying a geographic origin for, and in correspondence with audible rendering of, another user's performance received via the communications interface directly or indirectly from a remote device.

In some cases or embodiments, the portable computing device includes a communications interface and the method further includes directly or indirectly receiving, and audibly rendering on the portable computing device, another user's performance captured at a remote device. In some cases or embodiments, the other user's performance is itself encoded as a gesture stream. In some cases or embodiments, the other user's performance is a vocal performance captured at the remote device in correspondence with a corresponding musical score, and the audible rendering of the other user's performance is as a backing track for performance capture at the synthetic multi-string musical instrument executing on the portable computing device.

In some cases or embodiments, the method further includes transacting from the portable computing device a purchase or license of one or more of (i) the musical score, (ii) a musical instrument specific parameterization of the digital synthesis and (iii) a backing or vocal track for audible rendering in connection with capture of the user performance.

In some cases or embodiments, the portable computing device is selected from the group of: a compute pad, a game controller, a personal digital assistant or book reader, and a mobile phone or media player.

In some embodiments in accordance with the present invention, a method includes (i) using a portable computing device as a synthetic multi-string musical instrument; (ii) presenting visual cues on a multi-touch sensitive display of the portable computing device relative to respective visually presented strings of the synthetic multi-string musical instrument, the visual cues including both chord and string excitation visual cues presented in temporal correspondence with a musical score read from computer readable media; (iii) visually presenting on the multi-touch sensitive display a dynamic palette of user selectable chords; and (iv) capturing gestures on the multi-touch sensitive display, wherein at least some of the captured gestures are indicative of actual chord selections by a user from the dynamic palette, and wherein at least some of the captured gestures are indicative of string excitations.

In some cases or embodiments, the dynamic palette presents a time-varying, current subset of M currently selectable chords from a total set of N chords (M<N) that are visually cued throughout a course of performance capture based on the musical score. In some cases or embodiments, the method further includes retuning strings of the synthetic multi-string instrument in correspondence with particular chord selection indicative gestures captured on the multi-touch sensitive display. In some cases or embodiments, the dynamic palette presents a time-varying, current subset of chords selectable generally adjacent a first edge of the multi-touch sensitive display by one or more digits of the user's first hand, and the presented chord and string excitation visual cues transit the multi-touch sensitive display generally toward a sounding zone adjacent an opposing second edge of the multi-touch sensitive display for gesturing by one or more digits of the user's second hand.

In some cases or embodiments, the method further includes capturing a digit contact within a dynamic chord selection palette region of the multi-touch sensitive display as a chord selection and capturing traversal of plural strings visually depicted on the multi-touch sensitive display as strum-type excitations of the plural strings each tuned in accord with a currently gestured chord selection. In some cases or embodiments, the method further includes capturing a digit contact with an individual string visually depicted on the multi-touch sensitive display as a pluck-type excitation of the individual string tuned in accord with the currently gestured chord selection. In some cases or embodiments, the captured gestures indicative of string excitations include both pluck-type and strum-type gestures.

In some cases or embodiments, the method further includes normalizing a velocity attribute of a pluck-type string excitation indicative gesture to speeds of strum-type string excitation indicative gestures within a current temporal window of the user's performance.

In some cases or embodiments, the method further includes encoding a gesture stream for a performance of the user by parameterizing at least a subset of the chord selection and string excitation indicative user gestures and audibly rendering the performance on the portable computing device using the encoded gesture stream as an input to a digital synthesis of the synthetic string musical instrument executing on the portable computing device itself, wherein the captured gesture stream, and not the musical score itself, drives the digital synthesis. In some cases or embodiments, the digital synthesis includes a sample-based synthesis of constituent notes of the captured chord selection in correspondence with individually captured string excitations. In some cases or embodiments, the digital synthesis includes a sample-based synthesis of captured chord selection in correspondence with a captured strum-type excitation gesture. In some cases or embodiments, the synthetic multi-string musical instrument is a guitar.

In some cases or embodiments, the method further includes determining correspondence of respective captured string and chord excitation gestures with the visual cuings and grading the user's performance at least in part based on the determined correspondences, wherein the determined correspondences include (i) a measure of temporal correspondence of a particular string or chord excitation gesture with arrival of a corresponding visual cue in a sounding zone and (ii) a measure of correspondence of a chord selection gesture with the visual cue.

In some cases or embodiments, the method further includes presenting on the multi-touch sensitive display a lesson plan of exercises, wherein the captured chord selection and excitation gestures correspond to performance by the user of a particular one of the exercises and advancing the user to a next exercise of the lesson plan based on a grading of the user's performance of the particular exercise.

In some cases or embodiments, the portable computing device includes a communications interface and the method further includes: transmitting an encoded stream of the captured gestures via the communications interface for rendering of the performance on a remote device. In some cases or embodiments, the method further includes geocoding the transmitted gesture stream and displaying a geographic origin for, and in correspondence with audible rendering of, another user's performance received via the communications interface directly or indirectly from a remote device.

In some cases or embodiments, the portable computing device includes a communications interface and the method further includes directly or indirectly receiving, and audibly rendering on the portable computing device, another user's performance captured at a remote device. In some cases or embodiments, the other user's performance is itself encoded as a gesture stream. In some cases or embodiments, the other user's performance is a vocal performance captured at the remote device in correspondence with a corresponding musical score, and the audibly rendering of the other user's performance is as a backing track for performance capture using the synthetic multi-string musical instrument.

In some cases or embodiments, the method further includes transacting from the portable computing device a purchase or license of one or more of (i) the musical score, (ii) a musical instrument specific parameterization of the digital synthesis and (iii) a backing or vocal track for audible rendering in connection with capture of the user performance. In some cases or embodiments, the portable computing device is selected from the group of: a compute pad, a game controller, a personal digital assistant or book reader, and a mobile phone or media player.

In some cases or embodiments, a computer program product is encoded in one or more media, the computer program product including instructions executable on a processor of the portable computing device to cause the portable computing device to perform one or more of the preceding methods. In some cases or embodiments, the one or more media are readable by the portable computing device or readable incident to a computer program product conveying transmission to the portable computing device and thereafter executable to cause the portable computing device to operate as a synthetic musical instrument in accordance with one or more of the preceding methods.

BRIEF DESCRIPTION OF THE DRAWINGS

The present invention may be better understood, and its numerous objects, features, and advantages made apparent to those skilled in the art by referencing the accompanying drawings.

FIG. 5 depicts correspondence between a musical score (visually depicted as guitar sheet music, based on the description herein, susceptible to encoding as string and chord tracks, e.g., MIDI-encoded tracks) supplied to a synthetic guitar-type musical instrument application to, in accordance with some embodiments of the present invention (s) or modes of operation, facilitate (i) a dynamic chord palette, (ii) string retunings in accordance with user-musician selections from the dynamic palette and (iii) visual cuings of both string excitations and the chord selections.

The use of the same reference symbols in different drawings indicates similar or identical items.

DETAILED DESCRIPTION

Figure 1:
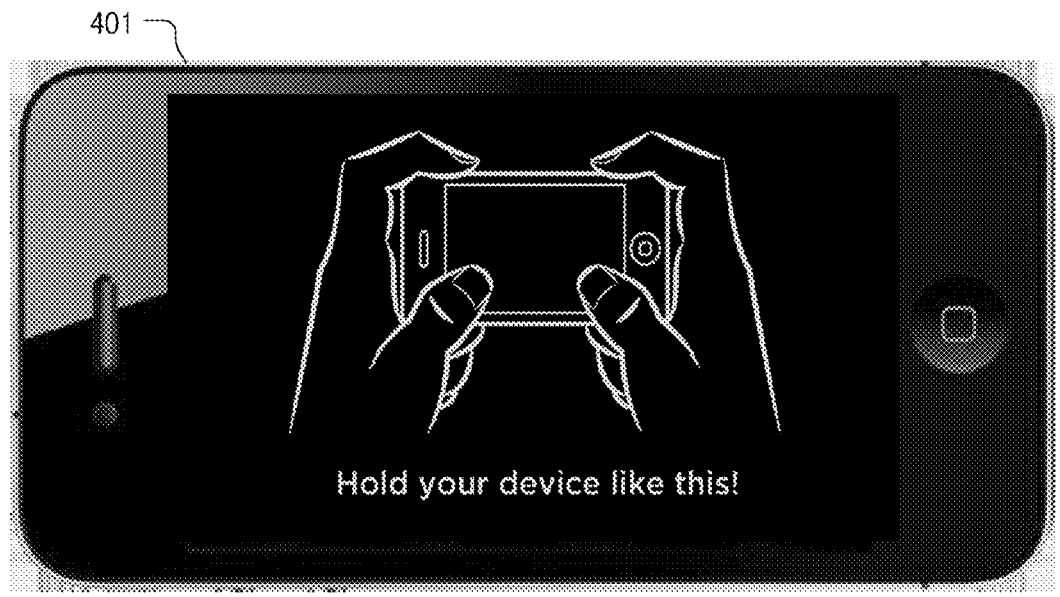
FIG. 1 is screen image of a mobile phone type portable computing device depicting a use scenario for a synthetic multi-string musical instrument application executing thereon in accordance with some embodiments of the present invention(s).
Figure 2:
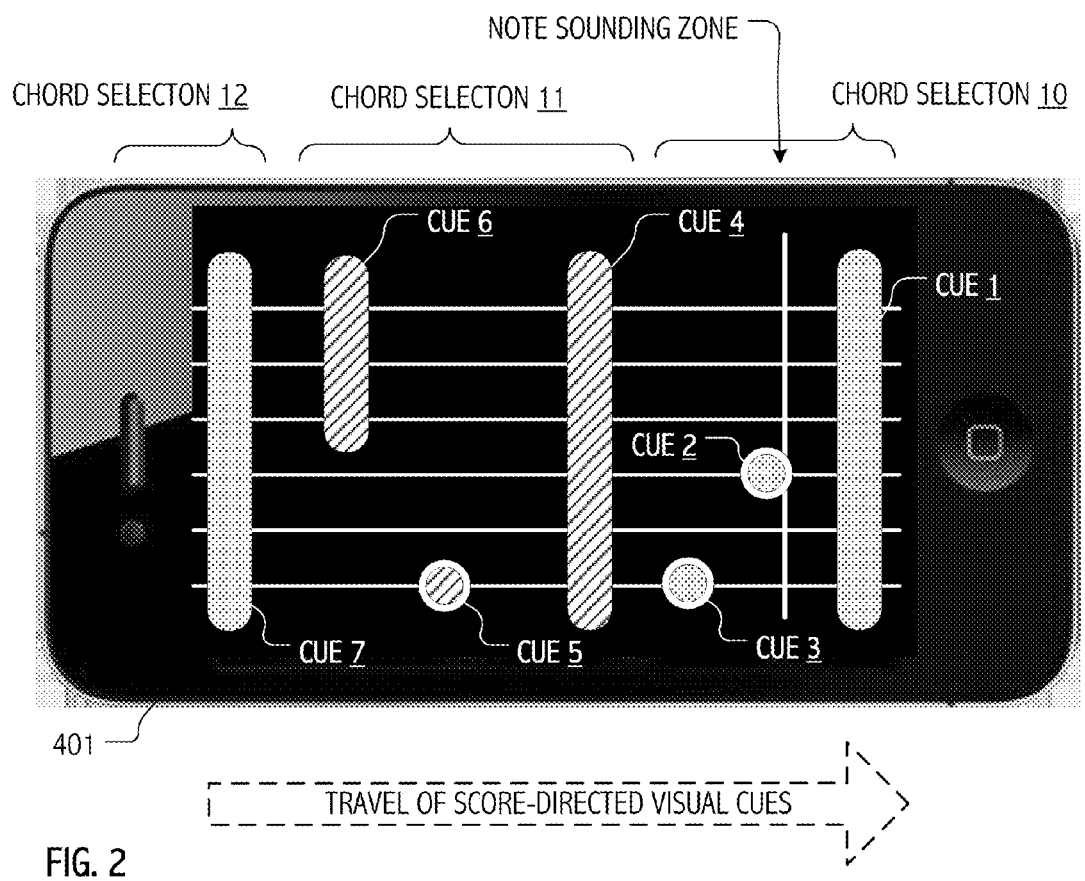
FIG. 2 is screen image of a mobile phone type portable computing device executing a synthetic guitar-type musical instrument application in accordance with some embodiments of the present invention(s), and in which visual cues are supplied and advanced in correspondence with a musical score.
Figure 3A:
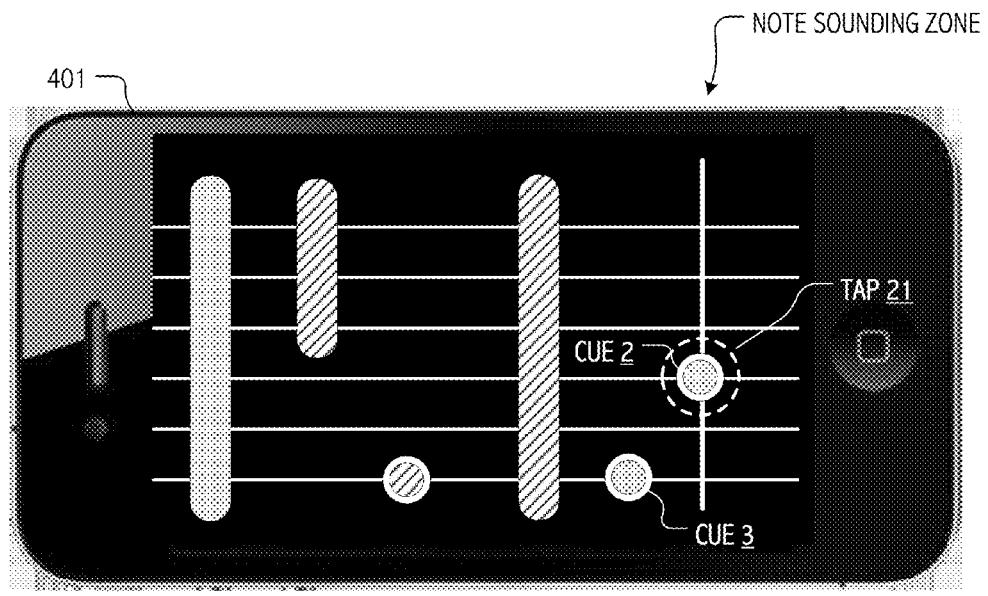
FIGS. 3A and 3B are screen images of a synthetic guitar-type musical instrument application in accordance with some embodiments of the present invention(s) or modes of operation in which strings are automatically and dynamically retuned in accordance with a chord track of a musical score, and in which successively gestured tap- and strum-type string excitations (e.g., by a user-musician) of the dynamically returned strings are illustrated.
Figure 3B:
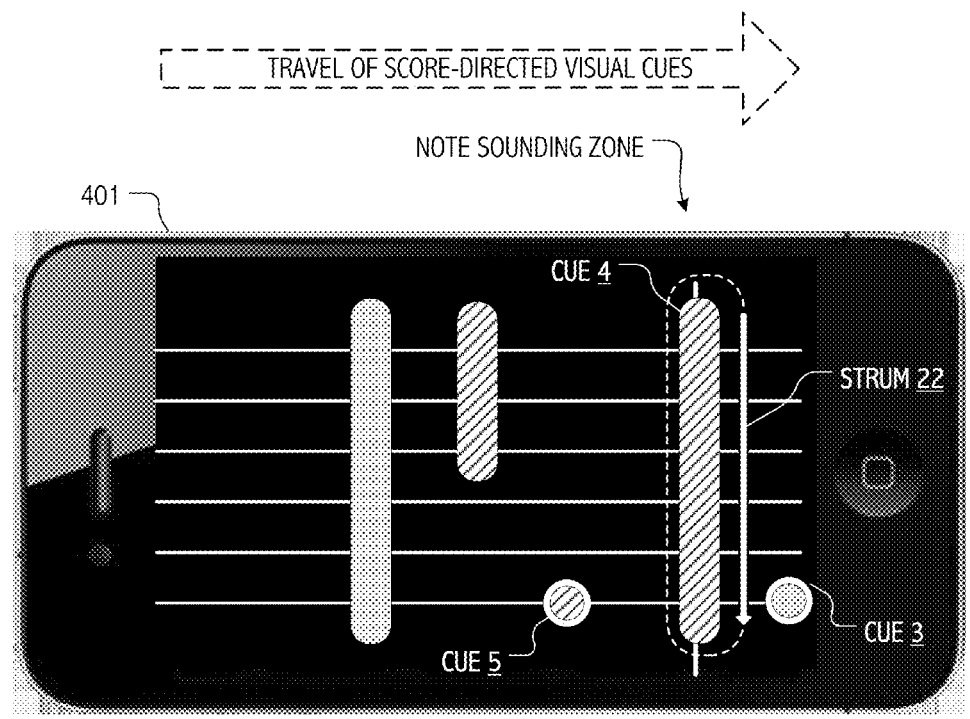
Figure 4A:
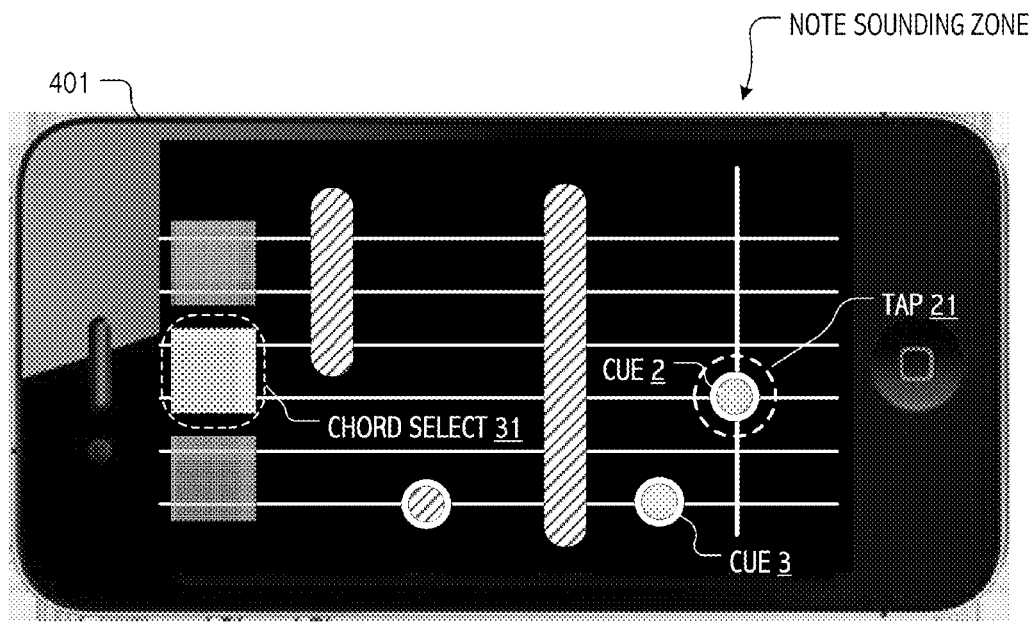
FIGS. 4A and 4B are screen images of a synthetic guitar-type musical instrument application in accordance with some embodiments of the present invention(s) or modes of operation in which strings are manually retuned in accordance chord selections gestured (e.g., by a user-musician) using a dynamic current palette of selectable chords automatically derived from the musical score, and in which successively gestured tap- and strum-type string excitations (again by the user-musician) of the dynamically returned strings are illustrated.
Figure 4B:
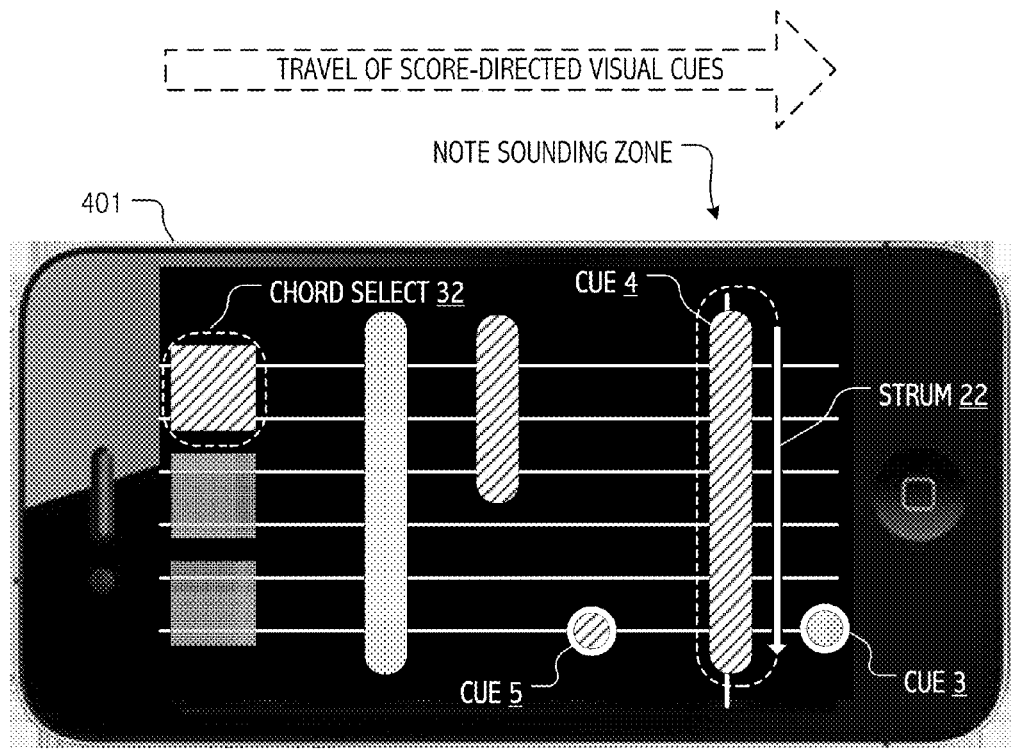
Figure 6:
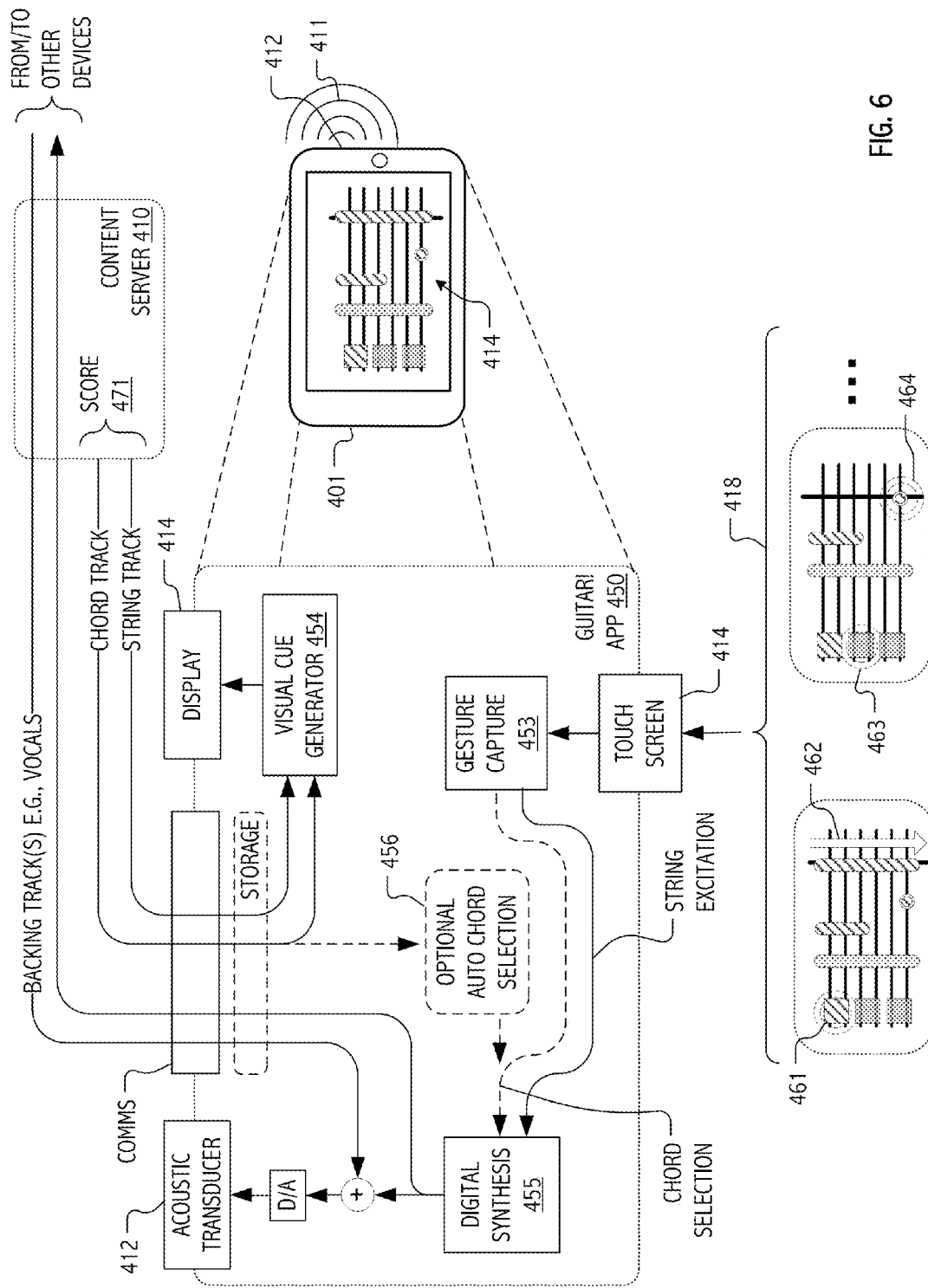
FIG. 6 is a functional block diagram illustrating hardware, software and firmware components, as well as dataflows and interactions thereamongst, in a portable computing device-hosted synthetic guitar-type musical instrument application in accordance with some embodiments of the present invention(s).
Figure 7:
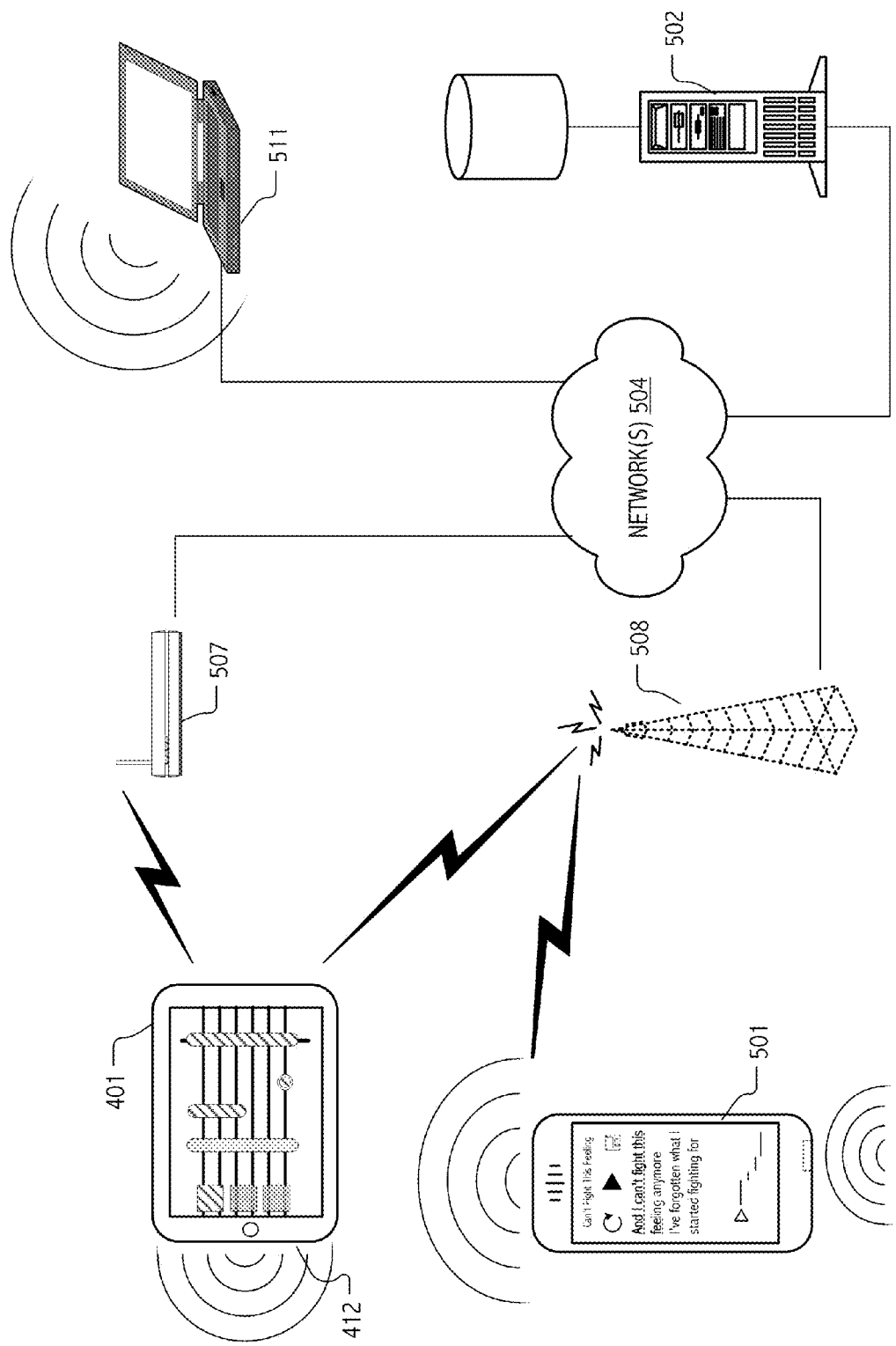
FIG. 7 is a network diagram depicting certain illustrative use scenarios for a synthetic guitar-type musical instrument application in accordance with some embodiments of the present invention(s).

In some embodiments in accordance with the present invention(s), a musical score including chord and string tracks is retrieved from storage to provide a visual cue generator with a coordinated temporal sequence of string excitation and chord selection cues for visual depiction (on screen) in correspondence with an audible rendering of a backing track. In some embodiments or modes of operation, a dynamic palette of chord selections is computed and presents the user-musician with a contextually relevant subset of M current chord selections from amongst a larger number, N, of chord employed in a full score of the song visually cure for user performance. In some embodiments, computations to provide the dynamic palette are provided in a manner that will be appreciated by persons of ordinary skill in the art based on the following pseudocode.

```
// type ChordArray is an array of midi notes, one per guitar
// string, that will eventually be assigned to each string as
// well as a unique chord ID, for example: a standard G chord
// would be [43, 47, 50, 55, 62, 67]
// type SongArray is an array of type ChordArray, including
// timing information for the temporal location of the chord
// assume we start with a SongArray parsed from our score
// information
SongArray songChords = getSongArrayFromScore( );
// First we parse out the unique chords in a SongArray while
// assigning every single chord in the SongArray a unique
// chord ID
Array uniqueChords;
currentSongTime = 0.0;
// scan for unique arrays of notes or "chords" in the score
// before starting the song (not in real time). The size of
// this array will equal what we are calling "N" chords in the
// application
while ( songIsOver( ) == false ) {   // loop until end of song
    // check the current song time to see if the next chord is
    // available since our loop
    if ( songChords.nextChordAvailble(currentSongTime) ) {
        // get this next chord
        ChordArray nextChord =
            songChords.getNextChord(currentSongTime);
        // if it DOES NOT exist in the unique chords array, add it
        if ( uniqueChords.contains(nextChord) == false ) {
            // unique chord ID is based on the position in the array
            nextChord.chordID = uniqueChords.size( );
            uniqueChords.add(nextChord);
        }
        // if it DOES exist, we just assign it a chord ID based on
        // the position in the array
        else {
            nextChord.chordID = uniqueChords.indexFor(nextChord);
        }
    }
    currentSongTime += prePerformanceTimeInterval;
}
// we have now assigned each chord in the song a unique ID
// which we can use to assign consistently to one of the "M"
// chord buttons. we will begin playing the song in real time
// and be able to assign the N chords to the M buttons with a
// simple modulo function
currentSongTime = 0;
songChords.reset( );
while ( songIsOver( ) == false ) { // looping until end of song
    // check the current song time to see if the next chord is
    // available since our loop
    if ( songChords.nextChordAvailble(currentSongTime -
        lookaheadTime) ) // lookaheadTime relates to how far ahead
                        // of the current song time we need to
                        // consider displaying the notes and
                        // chords
    {
        // get this next chord
        ChordArray nextChord =
            songChords.getNextChord(currentSongTime);
        // assign this chord to one of M chord buttons based on
        // the modulo, in practice this assignChordToButton
        // function would actually add a simple check to ensure
        // two different chords of the same color do not appear
        // adjacently
        assignChordToButton( nextChord.chordID %
            totalNumberButtons );
    }
    currentSongTime += performanceTimeInterval;
}
// assigning the ChordArray to the strings is simply taking
// the array of notes and assigning it one-to-one to each
// string in the case of Easy mode, this is done automatically
// for the user, synchronized with the score
while ( songIsOver( ) == false ) { // loop until end of song
    // check the current song time to see if the next chord is
    // available since our loop
    if ( songChords.nextChordAvailble(currentSongTime) ) {
        // get this next chord
        ChordArray nextChord =
            songChords.getNextChord(currentSongTime);
        assignChordToStrings(nextChord);
    }
```

```
        currentSongTime += performanceTimeInterval;
    }
    // in the case of Medium and Hard modes, a chord is assigned
    // to strings when the user actuates a chord button. because
    // of the lookahead time in assigning the chords to the chord
    // button, the chord buttons are always loaded with the
    // correct next chord. in practice, the chord button actually
    // is maintaining an array of next chords, since it is
    // possible that two chords may be assigned within one
    // lookahead time window
    void chordButtonPressed( int buttonID ) {
        assignChordToStrings(
            chordButtons[buttonID].currentAssignedChord);
    }
    // here is how the assignChordToStrings function works. it is
    // a one-to-one assignment of midi values to strings
    void assignChordToStrings( ChordArray chord ) {
        for ( i = 0; i < numStrings; i++ )
            string[i].setNote(chord[i]);
    }
```

In addition, it will be appreciated that in some embodiments, modes or use scenarios, a synthetic multi-string musical instrument such as illustrated and described herein may be provided in cooperative communication with other synthetic musical instruments (multi-string or otherwise) and/or vocal capture platforms. Often, such other synthetic musical instruments and/or vocal capture platforms will themselves execute on remote devices (e.g., remote portable computing devices) to allow collaborative (though potentially geographically dispersed) performances by multiple user/musician/performers. The following commonly-owned, co-pending U.S. patent applications are incorporated by reference as illustrative of the types and general design implementations synthetic musical instruments and/or vocal capture platforms that are envisioned as part of a collaboration network:

U.S. patent application Ser. No. 13/664,939, filed Oct. 31, 2012, entitled "SYNTHETIC MUSICAL INSTRUMENT WITH PERFORMANCE-AND/OR SKILL-ADAPTIVE SCORE TEMPO" and naming Hamilton, Chaudhary, Lazier and Smith as inventors;

U.S. patent application Ser. No. 13/715,920, filed Dec. 14, 2012, entitled "SYNTHETIC MULTI-STRING MUSICAL INSTRUMENT WITH SCORE CODED PERFORMANCE EFFECT CUES AND/OR CHORD SOUNDING GESTURE CAPTURE" and naming Hamilton, Kruge and Wang as inventors; and U.S. patent application Ser. No. 13/085,414, filed Apr. 12, 2011, entitled "COORDINATING AND MIXING VOCALS CAPTURED FROM GEOGRAPHICALLY DISTRIBUTED PERFORMERS" and naming Cook, Lazier, Lieber and Kirk as inventors.

In some embodiments, backing or coordinated tracks, e.g., accompaniment, backing vocals etc., may be captured at remote computing devices hosting social music applications such as described in one or more of the foregoing incorporated applications based on a same or coordinated musical score. These are other variations will be understood connection with the claims that follow.

What is claimed is:

1. A method for using a portable computing device as a synthetic multi-string musical instrument comprising:

retrieving a musical score from storage accessible to the portable computing device, the retrieved musical score including temporally coordinated chord and string tracks;

presenting string excitation visual cues on a multi-touch sensitive display of the portable computing device in temporal correspondence with the retrieved musical score;

capturing a stream of user performance gestures on the multi-touch sensitive display, wherein at least some of the captured gestures are indicative of string excitations; and audibly rendering the user performance on the portable computing device using the captured gesture stream as an input to a digital synthesis of the synthetic multi-string musical instrument executing on the portable computing device with dynamic string retuning in correspondence with chord selections, wherein the captured string excitation indicative gestures, and not the musical score itself, drives the digital synthesis.

2. The method, as recited in claim 1, wherein the dynamic retuning is automatic and in correspondence with the chord track.

3. The method, as recited in claim 1, further comprising:

based on the chord track, visually presenting on the multi-touch sensitive display both a dynamic palette of user selectable chords and chord selection visual cues, wherein at least some of the captured gestures are indicative of actual chord selections gestured by the user using the dynamic palette, and wherein the dynamic string retuning is in correspondence with the captured chord selection indicative gestures.

4. The method, as recited in claim 1, wherein the captured string excitation indicative gestures include both pluck-type and strum-type gestures.

5. The method, as recited in claim 4, further comprising:

normalizing a velocity attribute of a pluck-type string excitation indicative gesture to speeds of strum-type string excitation indicative gestures within a current temporal window of the user's performance.

6. The method, as recited in claim 1, wherein the digital synthesis includes a sample-based synthesis of constituent notes of the chord selections in correspondence with individually captured string excitations.

7. The method, as recited in claim 1, wherein the digital synthesis includes a sample-based synthesis of the chord selections in correspondence with a captured strum-type excitation gesture.

8. The method, as recited in claim 1, wherein the synthetic multi-string musical instrument is a guitar.

9. The method, as recited in claim 1, further comprising:

determining correspondence of captured gestures with the visual cuings; and grading the user's performance at least in part based on the determined correspondences, wherein the determined correspondences include a measure of temporal correspondence of a particular gesture with arrival of a corresponding visual cue in a sounding zone.

10. The method, as recited in claim 1, further comprising:

presenting on the multi-touch sensitive display a lesson plan of exercises, wherein the captured gestures correspond to performance by the user of a particular one of the exercises; and advancing the user to a next exercise of the lesson plan based on a grading of the user's performance of the particular exercise.

11. The method, as recited in claim 1, wherein the portable computing device includes a communications interface and the method further includes:
    transmitting an encoded stream of the captured gestures via the communications interface for rendering of the performance on a remote device.

12. The method, as recited in claim 11, further comprising:
    geocoding the transmitted gesture stream; and
    displaying a geographic origin for, and in correspondence with audible rendering of, another user's performance received via the communications interface directly or indirectly from a remote device.

13. The method, as recited in claim 1, wherein the portable computing device includes a communications interface and the method further includes:
    directly or indirectly receiving, and audibly rendering on the portable computing device, another user's performance captured at a remote device.

14. The method, as recited in claim 11, wherein the other user's performance is itself encoded as a gesture stream.

15. The method, as recited in claim 11,
    wherein the other user's performance is a vocal performance captured at the remote device in correspondence with a corresponding musical score, and
    wherein the audible rendering of the other user's performance is as a backing track for performance capture at the synthetic multi-string musical instrument executing on the portable computing device.

16. The method, as recited in claim 1, further comprising:
    transacting from the portable computing device a purchase or license of one or more of (i) the musical score, (ii) a musical instrument specific parameterization of the digital synthesis and (iii) a backing or vocal track for audible rendering in connection with capture of the user performance.

17. The method of claim 1, wherein the portable computing device is selected from the group of:
    a compute pad;
    a game controller;
    a personal digital assistant or book reader; and
    a mobile phone or media player.

18. A computer program product encoded in one or more non-transitory media, the computer program product including instructions executable on a processor of the portable computing device to cause the portable computing device to perform the method of claim 1.

19. The computer program product of claim 18, wherein the one or more non-transitory media are readable by the portable computing device or are readable in a course of conveying the computer program product to the portable computing device.

20. A method for using a portable computing device as a synthetic multi-string musical instrument comprising:
    presenting visual cues on a multi-touch sensitive display of the portable computing device relative to respective visually presented strings of the synthetic multi-string musical instrument, the visual cues including both chord and string excitation visual cues presented in temporal correspondence with a musical score read from computer readable media;
    visually presenting on the multi-touch sensitive display a dynamic palette of user selectable chords; and
    capturing gestures on the multi-touch sensitive display, wherein at least some of the captured gestures are indicative of actual chord selections by a user from the dynamic palette, and wherein at least some of the captured gestures are indicative of string excitations.

21. The method, as recited in claim 20,
    wherein the dynamic palette presents a time-varying, current subset of M currently selectable chords from a total set of N chords (M<N) that are visually cued throughout a course of performance capture based on the musical score.

22. The method, as recited in claim 20, further comprising:
    retuning strings of the synthetic multi-string instrument in correspondence with particular chord selection indicative gestures captured on the multi-touch sensitive display.

23. The method, as recited in claim 20,
    wherein the dynamic palette presents a time-varying, current subset of chords selectable generally adjacent a first edge of the multi-touch sensitive display by one or more digits of the user's first hand, and
    wherein the presented chord and string excitation visual cues transit the multi-touch sensitive display generally toward a sounding zone adjacent an opposing second edge of the multi-touch sensitive display for gesturing by one or more digits of the user's second hand.

24. The method, as recited in claim 20, further comprising:
    capturing a digit contact within a dynamic chord selection palette region of the multi-touch sensitive display as a chord selection; and
    capturing traversal of plural strings visually depicted on the multi-touch sensitive display as strum-type excitations of the plural strings each tuned in accord with a currently gestured chord selection.

25. The method, as recited in claim 24, further comprising:
    capturing a digit contact with an individual string visually depicted on the multi-touch sensitive display as a pluck-type excitation of the individual string tuned in accord with the currently gestured chord selection.

26. The method, as recited in claim 20,
    wherein the captured gestures indicative of string excitations include both pluck-type and strum-type gestures.

27. The method, as recited in claim 26, further comprising:
    normalizing a velocity attribute of a pluck-type string excitation indicative gesture to speeds of strum-type string excitation indicative gestures within a current temporal window of the user's performance.

28. The method, as recited in claim 20, further comprising:
    encoding a gesture stream for a performance of the user by parameterizing at least a subset of the chord selection and string excitation indicative user gestures; and
    audibly rendering the performance on the portable computing device using the encoded gesture stream as an input to a digital synthesis of the synthetic string musical instrument executing on the portable computing device itself, wherein the captured gesture stream, and not the musical score itself, drives the digital synthesis.

29. The method, as recited in claim 28,
    wherein the digital synthesis includes a sample-based synthesis of constituent notes of the captured chord selection in correspondence with individually captured string excitations.

30. The method, as recited in claim 28,
wherein the digital synthesis includes a sample-based synthesis of captured chord selection in correspondence with a captured strum-type excitation gesture.

31. The method, as recited in claim 28,
wherein the synthetic multi-string musical instrument is a guitar.

32. The method, as recited in claim 20, further comprising:
determining correspondence of respective captured string and chord excitation gestures with the visual cuings; and
grading the user's performance at least in part based on the determined correspondences, wherein the determined correspondences include (i) a measure of temporal correspondence of a particular string or chord excitation gesture with arrival of a corresponding visual cue in a sounding zone and (ii) a measure of correspondence of a chord selection gesture with the visual cue.

33. The method, as recited in claim 20, further comprising:
presenting on the multi-touch sensitive display a lesson plan of exercises, wherein the captured chord selection and excitation gestures correspond to performance by the user of a particular one of the exercises; and
advancing the user to a next exercise of the lesson plan based on a grading of the user's performance of the particular exercise.

34. The method, as recited in claim 20, wherein the portable computing device includes a communications interface and the method further includes:
transmitting an encoded stream of the captured gestures via the communications interface for rendering of the performance on a remote device.

35. The method, as recited in claim 34, further comprising:
geocoding the transmitted gesture stream; and
displaying a geographic origin for, and in correspondence with audible rendering of, another user's performance received via the communications interface directly or indirectly from a remote device.

36. The method, as recited in claim 20, wherein the portable computing device includes a communications interface and the method further includes:
directly or indirectly receiving, and audibly rendering on the portable computing device, another user's performance captured at a remote device.

37. The method, as recited in claim 36, wherein the other user's performance is itself encoded as a gesture stream.

38. The method, as recited in claim 36,
wherein the other user's performance is a vocal performance captured at the remote device in correspondence with a corresponding musical score, and
wherein the audibly rendering of the other user's performance is as a backing track for performance capture using the synthetic multi-string musical instrument.

39. The method, as recited in claim 20, further comprising:
transacting from the portable computing device a purchase or license of one or more of (i) the musical score, (ii) a musical instrument specific parameterization of the digital synthesis and (iii) a backing or vocal track for audible rendering in connection with capture of the user performance.

40. The method of claim 20, wherein the portable computing device is selected from the group of:
a compute pad;
a game controller;
a personal digital assistant or book reader; and
a mobile phone or media player.

41. A computer program product encoded in one or more non-transitory media, the computer program product including instructions executable on a processor of the portable computing device to cause the portable computing device to perform the method of claim 20.

42. The computer program product of claim 41, wherein the one or more non-transitory media are readable by the portable computing device or are readable in a course of conveying the computer program product to the portable computing device.

* * * * *